Nov. 30, 1948.    S. B. CRESPI    2,455,235
PROCESS AND APPARATUS FOR TREATING MILK,
BLOOD, AND OTHER GLOBULAR LIQUIDS
Filed Jan. 30, 1941    3 Sheets-Sheet 1
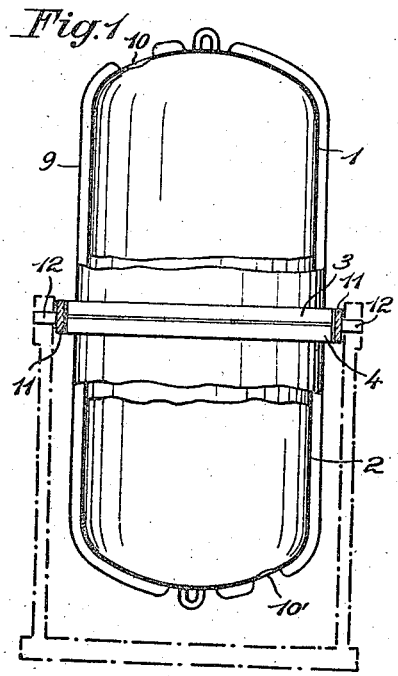
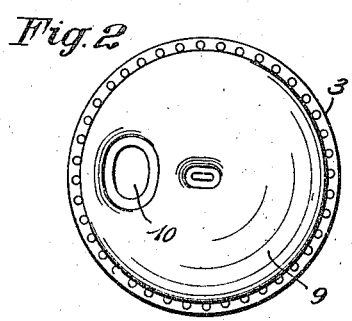
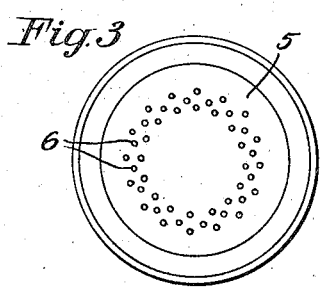
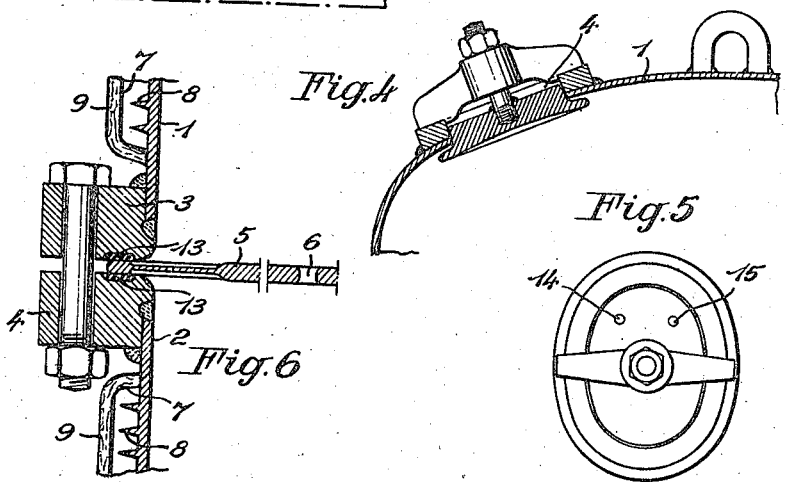
Inventor,
S. B. Crespi Patented Nov. 30, 1948

2,455,235

UNITED STATES PATENT OFFICE 2,455,235

PROCESS AND APPARATUS FOR TREATING MILK, BLOOD, AND OTHER GLOBULAR LIQUIDS

Silvio Benigno Crespi, Milan, Italy; vested in the Attorney General of the United States Application January 30, 1941, Serial No. 376,698
In Italy December 23, 1939

Sections 3 and 14, Public Law 690, August 8, 1946
Patent expires December 23, 1959

7 Claims. (Cl. 99—213)

1

It is considered to be that milk or cream can be kept for a long time if it is put into air tight containers and treated with oxygen at high pressure at a temperature below 8° C., and that if milk is heated to a temperature between 48° and 59° C. and then treated with oxygen at a pressure above 8 atmospheres and cooled down to a temperature not above 24° C. the result is a purification from noxious germs which is considered to be a great deal more effective than that obtained by pasteurisation and other similar methods, (milk pasteurisation), and the resulting milk may be preserved for a long time in normal conditions: i. e. at a temperature of from 18° to 28° C. Milk treated in this manner retains the organoleptic properties and the vitamin strength of pure milk and may be transported over great distances by land or sea with low cost.

However until now both the first and the second treatment could only be safely effected in small apparatus made of steel or of common enamelled steel, and the industrialisation of such treatments has not yet been attained: i. e. the application of apparatus having large dimensions (for instance 500 litres) and low cost, rendering the said treatments cheap and safe, has not yet been utilized.

A treatment on industrial scale of milk at an oxygen pressure above 8 atmospheres with the above mentioned object, requires:

1. Containers having a normal, and not an excessive cost as is the case with steel ones.

2. A perfect penetration of the oxygen molecules into the milk molecules: i. e. a perfect emulsification of the milk with the oxygen.

3. A rapid heating of the milk above 48° C., without ever rising above 60° C., which is the critical temperature of milk: i. e. the temperature at which its structure becomes altered.

4. That the temperature be maintained for a certain lapse of time (from one hour and a half to five hours) at above 48° C.

5. A rapid cooling of the mass of milk.

6. An easy bottling operation of the emulsified milk, the froth being prevented from getting into the bottles, and an equal distribution of milk in all the bottles being thus obtained.

I have satisfied all these requirements for a treatment on an industrial scale, and after long study and numerous experiments I have resolved all the problems in question with an apparatus and a method of treatment for the preservation of milk, cream and other alimentary liquids, forming the object of the present patent application.

2

I have thus created a new type of industrial apparatus, which forms the primary object of the present patent application.

According to the present invention, I have found that the partial or incipient homogenization which, as aforesaid, is effected by causing a mass of milk (or other alimentary liquid, especially a globular liquid as for instance blood) and of gaseous oxygen (or other gas having an analogous behaviour) at a high absolute pressure to pass through an apertured diaphragm, while maintaining a very moderate pressure differential between the two diaphragm surfaces, produces a useful output varying greatly dependent upon the diameter and length of the canals or apertures crossing said diaphragm.

Obviously other agents influence the quality of the treated milk, as the temperature, the absolute pressure, the differential pressure, the number of apertures or canals and the number of times that the milk is caused to pass through the latter. As far as the present invention is concerned, however, only the first above mentioned agents, i. e. the diameter and the length of the canals or apertures, have essential importance. According to the invention, these values must be placed in relationship with the medium diameter of the corpuscles of solid substances constituting the milk and disintegrating themselves up to a certain measure while passing through said canals or apertures.

By systematic experiments I have been able to discover that there are optimum values for the diameter and for the length of the canals crossing the diaphragm. These values could not have been foreseen, independently from experiment, on the sole basis of the preceding technical notions. In other words, I have discovered the existence of a particular field of conditions, within which the treatment forming the object of the present invention gives results which are superior to those obtained with values outside said field.

To be more accurate, the optimum values of the diameter and of the length of the canals or apertures depend on the pressure differential applied to the fluids in correspondence with the two surfaces of the diaphragm; for instance, with a differential pressure of about 40 centimeters of a column of water, better results have been obtained by using a diaphragm crossed by apertures having a diameter of 1 millimeter and a length of 10 millimeters, whilst with a greater differential pressure, the other conditions remaining as before, the same effect was obtained by using apertures which were slightly wider or shorter.

The annexed drawing illustrates, by way of an example, a manner of execution of the invention.

Fig. 1 is a diagrammatic illustration of the apparatus forming an object of the present invention shown in front view with parts in section.

Fig. 2 is a view from above of the same.

Fig. 3 shows a diaphragm fixed to the inside of the apparatus.

Fig. 4 is a section, in larger scale, of a detail.

Fig. 5 is a view from above of the aforesaid detail.

Fig. 6 is a section of a detail of the fixture of the diaphragm of Fig. 3, also shown in a larger scale.

Figure 7:
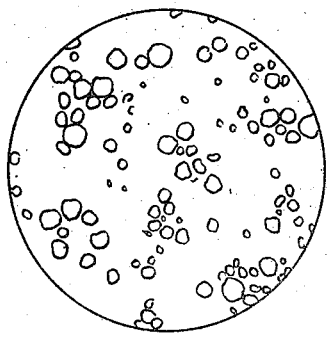
Figs. 7, 8, 9 are graphic reproductions of three photomicrographs showing the globules of milk.

The apparatus according to the invention are enamelled steel pressure reservoirs, consisting of two half cylinders 1 and 2, whose cylindrical parts vary in length. The half cylinders are flanged by flanges 3 and 4 and are riveted to each other in such a way as to enable them to withstand the internal operating pressure of 10 atmospheres and of 15 atmospheres in hydraulic test.

A disc 5 is held between the two half cylinders and is punctured by apertures 6 having special arrangement and dimensions, said disc has apertures extending therethrough whose diameters may vary from 3 mm. to 0.5 mm. and have a length of from 1 to 10 mm.

Each half cylinder forming the pressure reservoir is covered by a jacket 7 of thin sheets of steel, and preferably spiral ribs 8 are soldered between the outside part of the half cylinders and the inside part of the jacket. Openings provided with taps are furnished both at the top and bottom of each jacket.

A layer of insulating material 9 is applied to the outside of the jacket.

A small manhole 10 is provided on the dome of each half cylinder. On the cover of the top manhole a small valve of non-oxidizable steel is applied for the introduction of oxygen, a manometer and a tube, penetrating into the pressure reservoir as far as the milk level, are also furnished, the introduction of a thermometer being thus rendered possible. A big outlet valve also of non-oxidizable material is applied to the bottom manhole cover.

An iron ring 11, carrying two trunnions 12 is disposed round flanges 3 and 4 which join and secure the two half cylinders by means of rivets. Ring 11 is riveted to the flanges. Trunnions 12 are placed on two bearings carried by a strong trestle, not shown in the drawing, which can be provided with wheels.

All the weight of the pressure reservoir, jacket and insulating layer included, comes to bear on the trunnions and consequently on the two bearings, hence the whole pressure reservoir may oscillate and rotate on the axis of the two trunnions in which is also located the center of gravity. The container should revolve once or twice in twenty-four hours.

In the construction of such pressure reservoirs, the following rules must be kept in mind:

1. The inside of the pressure reservoir must be suitably smoothed so as to allow a proper enamelling.

2. The enamelling must be executed with enamels having a resilience not lower than that of steel, and as ordinary enamels are less resilient than steel, it is obvious that they would crack under a pressure of 10 atmospheres and thus allow the milk to come into contact with the steel and consequently be spoiled.

The enamels must be impervious to the combined actions of the acids contained in milk, of the heat and of the oxygen under 10 atmospheres pressure.

Lacquers obtained from synthetic resins and reduced to enamels are suitable for this scope. They are very resilient, easily repairable in case of breakage and their eventual scales are not noxious to the human organism, as would be the case with scales of vitreous materials if they were to be swallowed with milk.

3. In disc 5, held between flanges 3 and 4, by opposite packings 13, a certain number of small apertures must be punctured in the position indicated on the drawing.

When the pressure reservoir is filled with milk for $\tfrac{9}{10}$ and with oxygen for the remaining $\tfrac{1}{10}$ of its capacity, if it is in a vertical position, all the oxygen remains above the milk level. If it were turned upside down very rapidly and kept perfectly vertical, the oxygen would remain under the milk and theoretically it could not filter through the milk. But if the overturning movement takes place slowly, then the action of the apertured disc is such that inside the pressure reservoir different hydrostatic pressures are formed, and the oxygen filters through the apertures of the disc crossing the whole mass of milk.

Thus energetic filtrations are caused, and the smaller the apertures 6, and the more frequent the number of overturning movements, the more energetic and efficient the filtration becomes and all the more apt it is to break the larger fat globules contained in the milk and to reduce them to globules smaller than usual.

Thus I have the beginning of a homogenization process rendering the milk better because it becomes more digestible. In fact we know that a homogenization, i. e. a disintegration, by means of a very fine filtering under very high pressures of the fat globules, renders milk very easily digestible and therefore more suitable for children and weak stomachs in general.

This simple and economical treatment of milk combined with the use of a diaphragm having small apertures and the consequent reduction of the fat globules keeping them detached without having recourse to high presses, which forms the object of the present invention, is an absolute novelty and a great improvement on the treatment method in comparison with the pasteurizing treatment. In this way an excellent emulsion facilitating the preservation of milk for several days is obtained. This can easily be seen from the three photomicrographs graphically reproduced on the annexed drawing, in which:

The first (Fig. 7) shows the globules of raw milk, i. e. as it comes out of the cow sheds.

Figure 8:
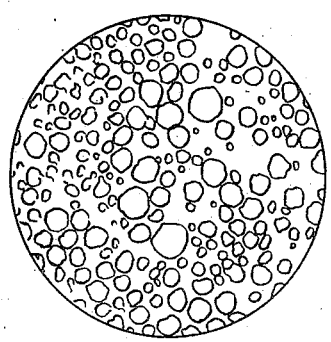

The second (Fig. 8) shows the milk globules enlarged and brought nearer to each other by pasteurisation.

Figure 9:
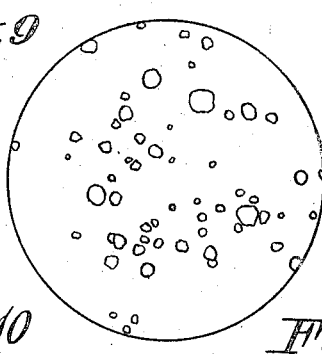
Figure 10:
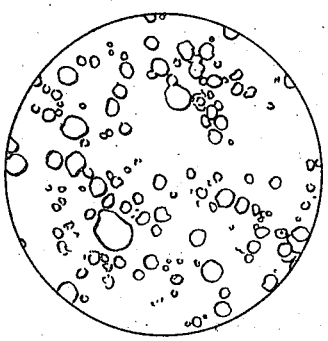
Fig. 10 shows a photomicrograph at 1200 enlargements of the fat globules contained in normal pure and raw milk.

The third (Fig. 9) shows the milk globules rendered smaller or detached from each other by the milk treatment of my invention (disc with small apertures, slow overturning movement of the pressure reservoir repeated several times).

4. The heating of the milk up to the most suitable temperature within the limits between 49° and 60° C. will be obtained either before the milk is poured into the reservoir, by making it pass through coils kept in hot water, or through plates of an ordinary pasteuriser; or otherwise after the milk has been poured into the pressure reservoir by circulating very hot water in the spirally ribbed jacket.

The ribs, especially if they are spirally disposed, increase the heating surface, and a few overturning movements of the pressure reservoir are sufficient to stir up the fluid mass bringing all the parts into contact with the heated walls. This second heating system will be very useful in small collection centers, where preheating apparatus are rarely to be found.

5. The most suitable temperature, between 48° and 60° C., will be easily preserved by emptying the circulation water out of the jacket and closing the taps. A thick layer of insulating material is applied on the top of the jacket. Thus the jacket forms an insulating air case and the insulating material, together with said air case, ensures a perfect preservation of the heat of the milk mass contained in the pressure reservoir, said mass cooling only very slowly indeed.

6. A rapid cooling of the mass of milk will be obtained by circulating cold water in the spirally ribbed jacket. As the waste surface is considerable and as the mass of milk is stirred by the overturning movement of the pressure reservoir, the subtraction of heat is rapid and sure.

7. An easy bottling operation with elimination of froth will be obtained by placing the pressure reservoir or reservoirs on a plane higher (for instance about 3 or 4 meters) than that on which the bottling machines are mounted. The outlet valve of the pressure reservoir will be connected by tubes to the bottling machine. When the outlet valve is opened, the pressure reservoir being kept vertical, the froth will remain at the top. The pressure, which will have to have been reduced, pushes the frothless liquid downwards along a descent corresponding to several meters, bearing in mind the residue pressure, and so the milk reaches the bottling machines free from froth, while during the operation said froth continually diminishes in volume, melting into liquid milk.

With the above described pressure reservoirs the operation is the following:

After having been filtered, the milk is introduced into the pressure reservoir, at the bottom through valve 10' if it has been preheated by means of coils or plates whereas if it is to be heated in the container itself by means of hot water circulating in jacket 7, the milk is introduced through the top opening.

When the pressure reservoir is $\frac{9}{10}$ full of milk, top man hole cover 10 is applied, and through valve 14 oxygen is introduced from an ordinary gas bottle, and the pressure is controlled by manometer 15 until it reaches approximately 15 atmospheres. Then inlet valve 14 is closed.

Then the pressure reservoir is slowly overturned either by hand or by mechanical means, causing it to accomplish several revolutions, rotating on the axis of trunnions 12 and thus causing all the milk to pass through the small apertures of the diaphragm. The number of revolutions will control the extent of the homogenization, but must not be such as to cause formation of butter.

The pressure reservoir will then be placed and secured in a vertical position. Valve 14 is opened and the oxygen allowed to escape, thus all the air and all the noxious gases from the cow shed, which any milk contains in a varying quantity, is vented.

Then the pressure reservoir is again filled with oxygen to obtain a pressure of approximately 10 atmospheres, or at least over 8 atmospheres. The pressure reservoir is again caused to rotate and a certain amount of time is allowed to elapse to enable the oxygen to accomplish its task and destroy the germs noxious to the milk, while the milk still retains certain acidifying elements.

As I have said, an hour and a half is sufficient to destroy the pathogenic elements, three hours are sufficient to preserve milk for a week, in five hours the best treatment is obtained, because then the milk lasts several weeks.

Lastly, the milk is cooled either bringing it to the bottling machine through a refrigerating apparatus provided with coils or plates, or by circulating cold water in the spirally ribbed jacket.

It is advisable to maintain the milk in an emulsified condition by causing the container to undergo one or several rotations every twenty-four hours.

The milk can be transported over great distances either by land or sea in the pressure reservoir containers described above, and they will benefit particularly in transport if they are constructed as movable railway cases.

Once bottled the milk will keep about 72 hours at temperatures of from 20 to 22° C. and up to ten days in cells maintaining their temperature below +10° C. and at limits very little below.

With the container or pressure reservoir above described, the modern milk collecting system can be facilitated.

Actually in the countries best organized for the production and collection of milk, the cow sheds of a restricted area send the fresh milk to a nearby collection center, where the milk is emptied from the cans into a capacious aluminum container, filtered and highly cooled (+4° C.) with refrigerating machines which are costly both as far as installation and upkeep are concerned. Then the milk is put into cans again and sent to the pasteurising center in trucks. Supposing the milk to arrive at 30° C. at the collection center, 25° C. refrigeration will be necessary to cool it; this refrigeration requires from 25 to 75 calories.

With my new apparatus the collecting centers will no longer need the big aluminum container and one will only have to fill the pressure reservoir after having filtered the milk. In the pressure reservoir itself, or before it is introduced into the same, the temperature of the milk will be raised from 35° to 55° C. employing 25 calories which will always cost less than the aforesaid 25° C. refrigeration. The milk heated to 55° C. will be treated with the multiple injection of oxygen and emulsified in the manner above described.

The pressure reservoir mounted on wheels will be brought to the collection center and during the journey and the necessary stops it will condition itself perfectly as meanwhile the time necessary for the destruction of the noxious germs will pass by. When the pressure reservoir arrives at the collection center the cooling and bottling operations take place.

Obviously this new method will be more economical and hygienically safer than the usual method. The milk will be knocked about less and better able to preserve all the good qualities it possesses at the moment of its being drawn from the cow. However small, it is considered that any cooling operation is detrimental to these good qualities.

The experiments shown in the photomicrograph of Figs. 12, 13, 14, 15 and 16 have been made in containers having identical dimensions.

Figure 11:
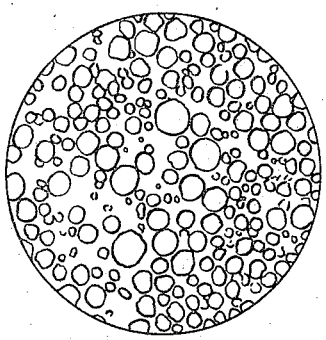
Fig. 11 shows a photomicrograph at 1200 enlargements of the fat globules contained in the same milk after a normal pasteurisation at 63° C.
Figure 12:
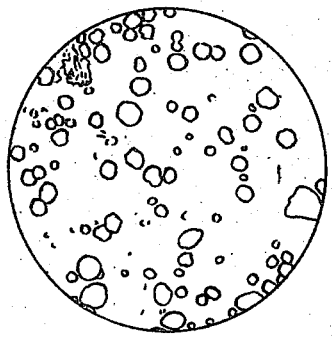
Fig. 12 is a photomicrograph similar to the preceding ones, showing the fat globules of the milk after heating and oxygen pressure treatment.
Figure 13:
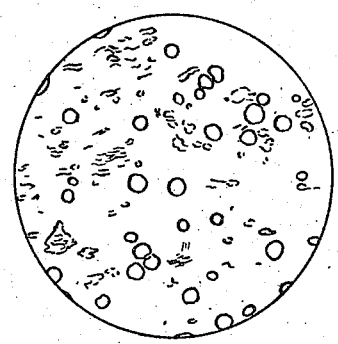
Fig. 13 is a photomicrograph similar to the preceding ones, showing the same milk treated with heat and under oxygen pressure, but in an air tight container with a diaphragm having apertures of 10 millimeters diameter.
Figure 14:
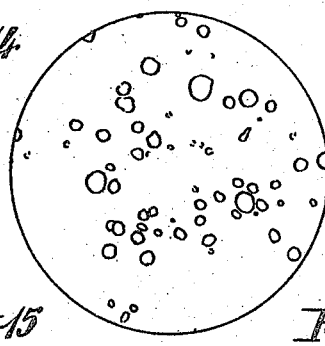
Fig. 14 is a photomicrograph similar to the preceding ones, showing the same milk treated with heat and under pressure, but in an air tight container with a diaphragm having apertures of 2 millimeters diameter.
Figure 15:
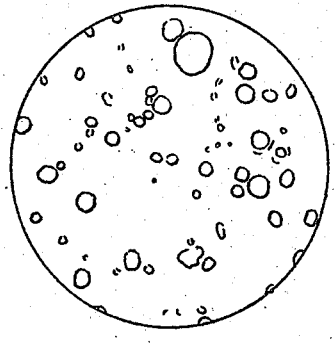
Fig. 15 is a photomicrograph similar to the preceding ones, showing the same milk treated with heat and under oxygen pressure, but in a closed container with a diaphragm having apertures of 1 millimeter diameter and 2 millimeters length.
Figure 16:
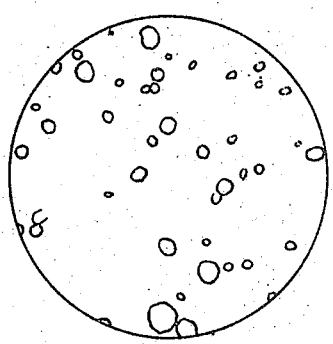
Fig. 16 is a photomicrograph similar to the preceding ones, showing the same milk treated with heat and under oxygen pressure, but in an air tight container with a diaphragm having apertures of 1 millimeter diameter and 10 millimeters length.

The enormous difference between the fat globules visible in the photomicrograph of Fig. 11 (plain pasteurised milk) and the fat globules shown in Fig. 16 (milk treated with a diaphragm having apertures of 1 millimeter of diameter and 10 millimeters of length) is evident; the pasteurised milk (Fig. 11) shows a conspicuous condensation of globules having a large diameter, whereas the milk treated according to the present invention presents few globules of normal diameter and a very great quantity of globules having an exceedingly reduced diameter, thus rendering the milk illustrated in Fig. 16 more similar to homogenized milk proper than to raw milk (Fig. 15).

As for bacteria contents, I have ascertained that in my invention it is much lower than in customarily pasteurized milk, and especially after 24, 48, 72 hours in open receptacles placed in rooms having a medium temperature of 24° C.

As regards preservation, it has been ascertained that with my invention it is superior both at normal and cold temperatures. Milk treated with my system and brought up to the optimum now reached, i. e. in conditions similar to those illustrated in the photomicrograph of Fig. 16, has lasted in perfect condition for seventy days in the container under pressure and then been bottled and kept in a cellar at +7° C. and has been preserved for three more weeks.

Thus I have demonstrated, with the utilization of my invention, that milk may be preserved in bottles and ordinary containers much longer than it was heretofore possible with other methods.

Generally speaking, I can say that the best apparatus for the utilization of my invention is that comprehending canals having a diameter of from 0.5 to 3 millimeters and a length of from 2 to 20 millimeters, although I do not exclude that one can attain quite good results with greater diameters and shorter lengths.

The present invention has been illustrated and described in a preferred embodiment with reference to the treatment of milk, but it is understood that it may be analogously applied to other alimentary liquids, especially globular or coagulatable liquids, as for instance blood, and that constructive changes may be introduced therein without departing from the scope of the said invention.

What I claim is:

1. An apparatus for the treatment of milk and other alimentary liquids, especially liquids having globular or coagulatable structure, to improve their preservation and render them more easily digestible, consisting of an air tight rotatable container resistant to pressure, two half cylinders with their open ends facing each other constituting the container, flanges on the open ends, a ring carrying two trunnions around said flanges, a disc fastened between the flanges, said disc perforated with small holes, and man holes at the respective ends for filling and emptying the container.

2. An apparatus for the treatment of milk and other alimentary liquids, especially liquids having globular or coagulatable structure, to improve their preservation and render them more easily digestible, consisting of a transversely halved air tight container resistant to pressure, a diaphragm, suitably punctured by apertures having diameters of from 3 millimeters to 0.5 millimeter and a length of from 2 millimeters to 20 millimeters, being interposed between the upper and lower halves of the said container.

3. An apparatus for the treatment of milk and other alimentary liquids, especially liquids having globular or coagulatable structure, to improve their preservation and render them more easily digestible, consisting of a transversely halved air tight container resistant to pressure, a diaphragm, suitably punctured by apertures having diameters of from 3 millimeters to 0.5 millimeter and a length of from 2 millimeters to 20 millimeters, being interposed between the upper and lower halves of the same, said container being rotatably mounted on an axis passing transversely through its center of gravity.

4. An apparatus for the treatment of milk and other alimentary liquids, especially liquids having globular or coagulatable structure, to improve their preservation and render them more easily digestible, consisting of a transversely halved air tight container resistant to pressure, a diaphragm, suitably punctured by apertures having a diameter of 1 millimeter and a length of 10 millimeters, being interposed between the upper and lower halves, said container being rotatably mounted on an axis passing transversely through its center of gravity.

5. A process for treating liquids carrying globular bodies of the group consisting of milk and blood contained in two adjoining confined zones connected with each other by numerous narrow elongated channels, said zones being so positioned that they rotate together and when in a vertical position are located one above the other, when thus positioned filling completely the lower zone and partially the upper zone, with heated liquid, forcing under pressure a gas into the space above the liquid level, slowly rotating the joined zones through a vertical plane whereby the upper zone becomes the lower and vice versa, thereby due to gravity, the gas passes upward through the channels compressing the globules both breaking them up and purifying the liquid, repeating the rotation once or twice every twenty-four hours.

6. The process of claim 5, in which the channels connecting the zones are from one to three mm. in diameter and of a length of two to ten mm., and in which the liquid is milk and the gas is oxygen, the temperature of the milk between 48° and 60° C. and the pressure between 8 and 10 atmospheres.

7. The process of claim 5, in which the channels connecting the zones are from one to three mm. in diameter and of a length of two to ten mm., and in which the liquid is blood and the gas is oxygen, the temperature of the blood between 48° and 60° C. and the pressure between 8 and 10 atmospheres.

SILVIO BENIGNO CRESPI.

REFERENCES CITED

The following references are of record in the file of this patent:

UNITED STATES PATENTS

| Number | Name | Date |
|---|---|---|
| 672,994 | Wacker | Apr. 30, 1901 |
| 1,014,574 | Kitchen | Jan. 9, 1912 |
| 1,041,120 | Loeb | Oct. 15, 1912 |
| 1,057,519 | Atkins | Apr. 1, 1913 |
| 1,658,168 | Kitchen | Feb. 7, 1928 |
| 2,132,854 | Knott | Oct. 11, 1938 |

FOREIGN PATENTS

| Number | Country | Date |
|---|---|---|
| 692,687 | France | Aug. 5, 1930 |